United States Patent
Stein et al.

(10) Patent No.: US 9,369,362 B2
(45) Date of Patent: Jun. 14, 2016

(54) TRIANGLE LOOPBACK

(71) Applicant: RAD DATA COMMUNICATIONS LTD., Tel Aviv (IL)

(72) Inventors: Yaakov Stein, Jerusalem (IL); Ron Insler, Ganei Tikva (IL); Alon Geva, Hod Ha'sharon (IL)

(73) Assignee: RAD DATA COMMUNICATIONS LTD., Tel Aviv (IL)

( * ) Notice: Subject to any disclaimer, the term of this patent is extended or adjusted under 35 U.S.C. 154(b) by 197 days.

(21) Appl. No.: 13/945,934

(22) Filed: Jul. 19, 2013

(65) Prior Publication Data

US 2015/0023179 A1    Jan. 22, 2015

(51) Int. Cl.
*H04L 12/26* (2006.01)

(52) U.S. Cl.
CPC ........ *H04L 43/0858* (2013.01); *H04L 43/0811* (2013.01); *H04L 43/0841* (2013.01); *H04L 43/10* (2013.01)

(58) Field of Classification Search
None
See application file for complete search history.

(56) References Cited

U.S. PATENT DOCUMENTS

| | | | | |
|---|---|---|---|---|
| 5,014,344 A | * | 5/1991 | Goldberg | 455/503 |
| 5,095,444 A | * | 3/1992 | Motles | 709/224 |
| 2006/0007863 A1 | | 1/2006 | Naghian | |
| 2007/0147385 A1 | | 6/2007 | Druke et al. | |
| 2007/0189187 A1 | * | 8/2007 | Ryu et al. | 370/252 |
| 2007/0223537 A1 | * | 9/2007 | Crowle et al. | 370/503 |

OTHER PUBLICATIONS

International Search Report dated Feb. 3, 2015 for corresponding PCT Application PCT/IB2014/063182, international filed Jul. 17, 2014.

* cited by examiner

*Primary Examiner* — Gregory Sefcheck
*Assistant Examiner* — Rina Pancholi
(74) *Attorney, Agent, or Firm* — A.C. Entis-IP Ltd.

(57) ABSTRACT

A method of characterizing a communications channel between two communications nodes, the method comprising: determining at least one feature of a communications path between a first communications node and a second communications node; determining at least one feature of a communications path between the first communications node and a third communications node; transmitting at least one packet from the first node to propagate through the second and third nodes and return to the first node; and determining at least one feature of the communications channel between the second and third nodes responsive to receiving the packet at the first node, the at least one determined feature of the first node and the second node, and/or information comprised in the packet.

6 Claims, 2 Drawing Sheets

TRIANGLE LOOPBACK

FIELD

Embodiments of the invention relate to loopback testing of communications paths.

BACKGROUND

Communications networks Operations, Administration, and Maintenance (OAM) protocols are used to monitor the connectivity and performance parameters, such as propagation delay or information loss, of communications paths between communications nodes in the networks. For packet switched networks, these protocols may entail transmission and reception of special packets, known as OAM packets, which conform to standardized protocols. For networks based on Ethernet, standardized OAM protocols have been defined by the ITU-T in Recommendation Y.1731 and by the IEEE in both 802.1ag (CFM) and 802.3ah (EFM) standards. For networks based on the Internet Protocol (IP), the IETF has specified Bidirectional Forwarding Detection (BFD) to monitor basic connectivity, the One-Way Active Measurement Protocol (OWAMP), and the Two-Way Active Measurement Protocol (TWAMP) to monitor performance parameters. For networks based on MPLS, the IETF has defined OAM protocols in RFCs 6374, 6375, 6426, 6427, 6428, and 6435.

Some OAM protocols for packet switched networks are one-way "heartbeat" protocols, in which a first communications node sends Continuity Check or "CC packets" to a second communications node, usually at some constant rate of packets per second. If the second communications node does not receive packets for some preconfigured period, conventionally chosen to be somewhat more than the time required for three CC packets to arrive, it declares a continuity fault. If most CC packets sent by the first communications node are received by the second communications node, the percentage of packets lost may be counted in order to determine the Packet Loss Ratio (PLR). In addition, if the first and second communications nodes share a common clock, or have synchronized clocks, one-way protocols may be used to measure the propagation delay across the communications path between them. Even without a common clock, one-way protocols may be used to measure Packet Delay Variation (PDV).

Some, OAM protocols are two-way "loopback" protocols, in which a first communications node sends loopback or "LB packets" to a second communications node, which reflects these packets back to the first communications node. Loopback protocols may be used to detect loss of continuity in either direction, measure PLR and PDV, and to measure round-trip delay without the need for a shared common clock or synchronized clocks.

In order to perform OAM functionality, the first communications node may periodically create, configure, and transmit to the second communications node a sequence of OAM (either CC or LB) packets. OAM packets may be transmitted at a low rate of for example, one per second, or at higher rates of tens or hundreds of packets per second. For example, if it is advantageous to detect a loss of continuity within 30 milliseconds, and the condition for detection is the conventional three lost packets, then OAM packets must be sent no less frequently then every 10 milliseconds, i.e., at least 100 packets per second. The first communications node may need to participate in a large number of such "OAM sessions", differing in packet characteristics (e.g., priority marking, packet size). Thus the computational toll of OAM protocols on the first communications node may be significant.

If it is desired to measure round-trip delay with a loopback protocol, the loopback packet must be time-stamped by the first communications node with a transmission time, $T_T(1)$. Upon receiving the loopback packet, the second communications node time-stamps the received loopback packet with the reception time, $T_R(2)$. Once the loopback response packet has been properly formed and is ready to be transmitted back to the first communications node, the second communications node time-stamps the response packet with the transmission time, $T_T(2)$ and transmits the response packet to the first communications node. Upon reception by the first communications node, the first communications node notes the arrival time with a fourth time-stamp $T_R(1)$. The round-trip delay is given by the total transit time $T_R(1)-T_T(1)$ reduced by the dwell time in the second communications node $T_T(2)-T_R(2)$.

Whereas it is possible to measure round-trip delay using a conventional OAM protocol it is not possible to directly measure a one-way delay in either direction via conventional loopback OAM. If it is known that the path between the first communications node and the second communications node consists of a single physical link, or this path is guaranteed to traverse the same network elements and the loading on all of these network elements is similar, then half the round-trip delay can be taken as a rough estimate of the one-way delay. In other cases there is no way of deducing the one-way delay based on conventional loopback OAM alone.

SUMMARY

Aspects of embodiments of the invention relate to providing a method for a first communications node to determine continuity and performance parameters, and in particular one-way delay, for a communications path between second and third communications nodes. The three communications nodes may be considered configured in a triangle, i.e., each node is connected to the two others, as depicted in FIG. 2A discussed below.

In accordance with an embodiment, to determine continuity between the second and third communications nodes, the first communications node first performs conventional loopback tests to test continuity of paths linking the first communications node and the second and third communications nodes. Once these continuities have been ascertained, the first communications node initiates a "triangle" loopback test, in accordance with an embodiment of the invention, by sending a "triangle loopback packet" to the second node. Unlike conventional loopback testing, the second communications node does not return the triangle loopback packet it receives to the first communications node, but rather forwards the triangle packet to the third communications node. If the path between the second and third nodes is continuous, the third communications node receives the triangle packet, and returns it to the first communications node, thereby completing the triangle loop around the three communications nodes and "informing" the first node that the path between the second and third nodes is functioning. If on the other hand the first node does not receive the triangle loopback packet, the triangle path is discontinuous and the first node is informed that the path between the second and third nodes is not functioning.

By means of the triangle loopback procedure described above, the first communications node determines continuity of the communications path in a direction from the second to the third communications nodes. To determine continuity, in accordance with an embodiment of the invention, in the direction from the third to the second communications node, the first communications node sends a triangle loopback packet to propagate "around the triangle", in a sense opposite to that in which the loopback packet propagated in determining continuity from the second to the third node.

By periodically repeating the procedure described above, one can monitor the continuity of the bi-directional path linking the second and third communications nodes. When performing loopback testing over time, some percentage of the individual loopback packets may be lost, for example due to bit errors along the path, or due to buffer over-runs at communications nodes. The first communications node may count the number of triangle loopback packets it sends, and the number of triangle loopback packets it receives, and calculate the percentage of packets lost, known as the Packet Loss Ratio, or PLR. However, this calculated PLR will be that of the entire path from the first communications node through the second and third and back to the first. In order to isolate the PLR of the path between the second and third communications nodes, sequence numbers and packet counters may be used.

Assume that the first communications node is connected to both the second and third communications nodes by direct physical links, or by paths known to be of symmetric delay, or by paths with asymmetry (i.e., the difference in delay between the two directions) less than a given acceptable amount of error. In accordance with an embodiment, to determine propagation delay on the path between the second and third communications nodes, the first communications node first performs conventional loopback round-trip delay measurements with both the second and third communications nodes, to measure the round-trip delays D(1,2,1) and D(1,3,1) which represent the round trip delay for packet propagation between the first and second nodes and the first and third nodes respectively. Since it is assumed that the packet delay between the first and second nodes is symmetric, the one-way packet delays in either direction D(1,2) and D(2,1) are the same and may be estimated to be equal to D(1,2,1)/2. Similarly, for the first and third nodes D(1,3)=D(3,1)=D(1,3,1)/2.

The first communications node then performs a triangle loopback delay measurement to determine the three-way delay for packet propagation from the first communications node through communications nodes two and three and back to the first communications node: D(1,2,3,1)=D(1,2)+D(2,3)+D(3,1). Since the one-way delays D(1,2) and D(3,1) have already been estimated, one can readily obtain the desired one-way delay from the second to the third communications nodes as D(2,3)=D(1,2,3,1)−D(1,2)−D(3,1).

It is noted that one-way delay D(3,2) between communications node three back to communications node 2, which may be different from the one-way delay just measured, may also be measured. For this measure, the first communications node sends a triangle loopback packet to communications node 3, to propagate back to node 1 after passing through node 2.

In the discussion, unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended. Unless otherwise indicated, the word "or" in the description and claims is considered to be the inclusive "or" rather than the exclusive or, and indicates at least one of, or any combination of items it conjoins.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to the figures attached hereto and noted following this paragraph. Identical structures, elements or parts that appear in more than one figure are generally labeled with a same numeral in all the figures in which they appear. A label labeling an icon representing a given feature of an embodiment of the invention in a figure may be used to reference the given feature. Dimensions of components and features shown in the figures are chosen for convenience and clarity of presentation and are not necessarily shown to scale.

DETAILED DESCRIPTION

Figure 1:
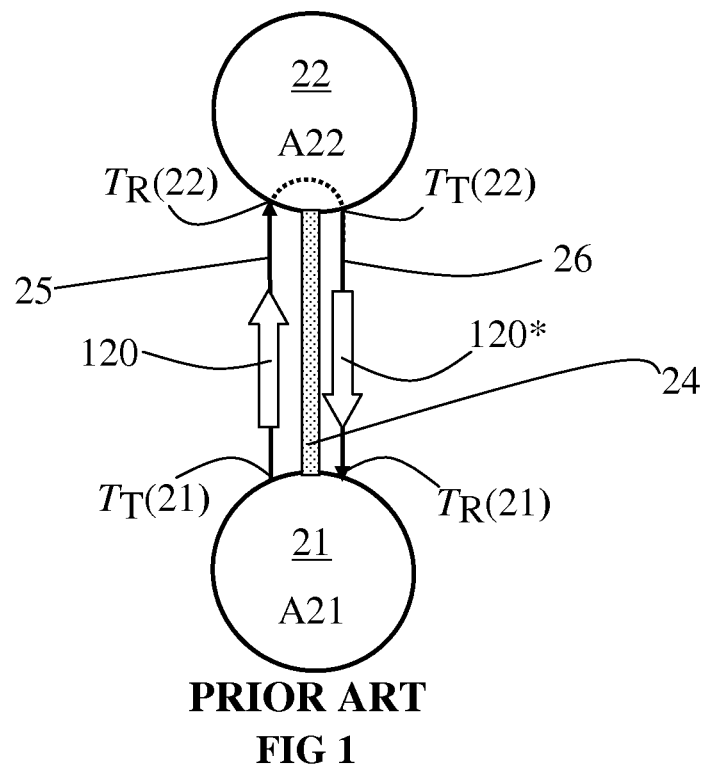
FIG. 1 schematically shows a first and a second communications node performing a conventional loopback test according to the prior art.

FIG. 1 schematically shows a first communications node 21 having an address "A21" performing nonintrusive (in-service) loopback testing according to the prior art with a second communications node 22 having an address "A22". Communications nodes 21 and 22 are connected by a communications path schematically represented by a shaded bar 24 and loopback testing is being used to determine continuity of communications path 24, to measure PLR of this path, and to measure round-trip delay D(21,22) for the path. Communications path 24 may be a physical link, or may comprise a sequence of links connected by further communications nodes (not shown). In performance of the loopback test, at a time $T_T(21)$ communications node 21 transmits a loopback packet, schematically represented by a block arrow 120, to communications node 22. Loopback packet 120 is coded with a destination address that is address A22 of communications node 22 and a source address that is address A21 of communications node 21. Loopback packet 120 is received at communications node 22 at a reception time $T_R(22)$. Transmission of loopback packet 120 from communications node 21 to communications node 22 over path 24 is represented by an arrow 25 and transmission and reception times $T_T(21)$ and $T_R(22)$ are shown at appropriate ends of arrow 25.

Upon receipt of loopback packet 120 communications node 22 processes the loopback packet according to the protocol being used. Loopback protocols may involve simple "reflection", wherein communications node 22 simply swaps source and destination addresses forming a packet 120\* with destination address A21 and source address A22, which is then forwarded back towards communications node 21. Alternatively, a loopback protocol may be a request/response protocol wherein communications node A22 parses the loopback packet 120, and forms a new loopback packet 120\*, which is forwarded towards communications node 21.

When loopback packet 120\* is received by communications node 21 it signifies that both directions of communications path 24 are operational. If packet 120\* is not received, it signifies that either packet 120 was never received by communications node 22, or that packet 120* was not received by communications node 21.

By periodically repeating the procedure described above, node 21 may monitor and/or be used to monitor the continuity of the bi-directional path 24 linking communications nodes 21 and 22. The sequence of such related loopback packets along with the processing state is known as an "OAM session". A communications node may, at any given time, simultaneously participate in a number of different OAM sessions, either with different remote nodes, or with the same node but with different packet characteristics (e.g., a session may be maintained for packets with a given priority level, or a given size).

When performing OAM testing over time, some percentage of the individual loopback packets may be lost, for example due to bit errors along the path, or due to buffer over-run at communications nodes. Communications node 21 may count the number of loopback packets it sends, and the number of packets it receives, and use the number sent and number received to determine the percentage of packets lost, known as the Packet Loss Ratio, or PLR via path 24.

In order to perform round-trip delay measurement in addition to basic CC and PLR measurement, communications node 21 inserts into loopback packet 120 a time-stamp, that is, a representation of the time of day at which the packet was transmitted, namely $T_T(21)$. When communications node 22 receives loopback packet 120, it immediately inserts an additional time-stamp representing the time of day $T_R(22)$ it received the packet. Node 22 buffers and processes the received loopback packet 120 to prepare a loopback packet 120* carrying the time stamp $T_R(22)$ for transmission back to node 21. Immediately before transmission of loopback packet 120* node 22 inserts an additional time-stamp $T_T(22)$ into the packet representing the time of transmission. When communications node 21 receives loopback packet 120*, it associates it with a time-stamp representing a time of reception $T_R(21)$. Irrespective of whether or not the clocks dictating time of day at communications nodes 21 and 22 are synchronized, the round-trip delay may be given by $D(21,22,21)=[T_R(21)-T_T(21)]-[T_T(22)-T_R(22)]$. If it may be assumed that the communications path 24 is symmetric, i.e., that the propagation delay from communications node 21 to communications node 22 equals the propagation delay from communications node 22 back to communications node 22, then the one-way delay in either direction, D(21,22) or D(22,21), is given by D(21,22,21)/2.

The prior art procedure described above suffer from several drawbacks. First, if a communications node must generate a large number of OAM sessions, this may create a significant resource drain on that node. Second, when round-trip continuity is not detected, conventional loopback testing does not furnish an indication as to which direction is faulty. Furthermore, when the communications path is not symmetric, loopback delay measurement does not furnish the one-way delays, unless clocks in the nodes are synchronized.

Figure 2A:
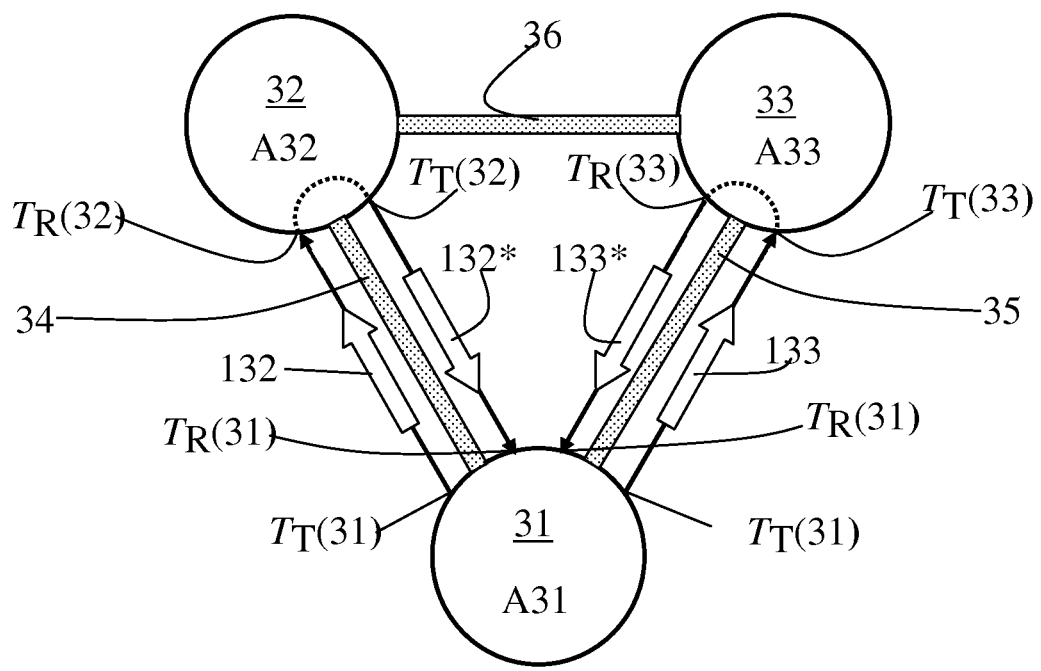
FIGS. 2A and 2B schematically show a first communications node determining a propagation delay between second and third communications nodes, in accordance with an embodiment of the invention.
Figure 2B:
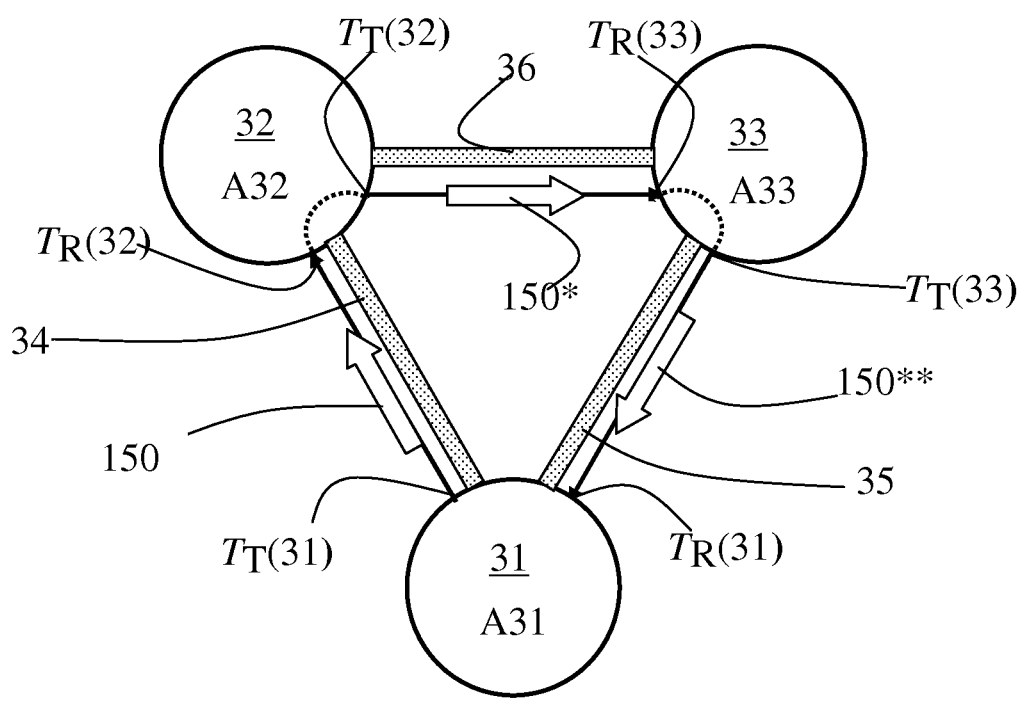

FIGS. 2A and 2B schematically show a first communications node 31 having address A31 operating to monitor and measure one-way delay for a communications path 36 between second and third communications nodes 32 and 33, having addresses A32 and A33 respectively, in accordance with an embodiment of the invention. Communications paths 34 and 35 connect communications node 31, either directly or via other nodes, with communications nodes 32 and 33 respectively.

To measure one-way delay for a communications path 36 in accordance with an embodiment of the invention, communications node 31, as schematically shown in FIG. 2A, may perform loopback continuity testing of the paths 34 and 35 according to the prior art. It may then transmit a triangle loopback packet 150 to communications node 32, which in turn forwards it to communications node 33, which forwards it back to communications node 31, as depicted in FIG. 2B. Since the triangle path consists of a concatenation of one-way paths 34, 36, and 35, and since continuity has been ascertained for paths 34 and 35, one may infer continuity for path 36 in the direction from communications node 32 to communications node 33. Similarly, by transmitting a triangle loopback packet to communications node 33, which in turn forwards it to communications node 32, which forwards it back to communications node 31, one may infer continuity for path 36 in the direction from communications node 33 to communications node 32.

In order for triangle loopback testing to function as described, it is necessary to ensure that the triangle loopback packet traverses communications paths 34, 36, and 35. According to an embodiment, this may be accomplished by pre-configuring communications nodes 32 and 33 to appropriately forward triangle loopback packets.

According to another embodiment, this may be accomplished by multiple encapsulations. Communications node 31 prepares a packet addressed from communications node 33 to itself, and places this inside a packet addressed from communications node 32 to communications node 33, and places this new packet into a triangle "encapsulation" packet addressed from itself to communications node 32. When communications node 32 receives the triangle loopback packet it removes the outer encapsulation "revealing" the packet addressed from itself to communications node 33 and appropriately forwards it. When communications node 33 receives this packet it removes the outer encapsulation and reveals the inner packet addressed from itself to communications node 31 and appropriately forwards it. Such multiple encapsulation may be performed for example using MAC-in-MAC encapsulation conforming to IEEE 802.1ah, by MPLS label stacking as described in IETF RFC 3031, or by IP-in-IP tunneling according to IETF RFC 2003.

In accordance with an embodiment of the invention, communications node 31 may measure the PLR of communications path 36 in the direction from communications node 32 to communications node 33 by transmitting, optionally, a triangle loopback encapsulation packet to communications node 32. Communications node 32 forwards this packet to communications node 33 which in turn forwards it back to communications node 31. By counting the number of packets received and comparing to the number of packets sent, communications node 31 can calculate the PLR of the entire round-trip communications path, comprising a concatenation of communications paths 34, 36, and 35.

In an embodiment of the invention the contribution of communications path 36 between communications node 32 and 33 to the total round-trip PLR is determined by use of packet counters. Communications node 31 inserts a sequence number into the triangle loopback packet and forwards it to communications node 32. The sequence number increases by one for each triangle loopback packet sent. Communications node 32 inserts into the triangle loopback packet a counter number giving a number of packets from the sequence that it did not receive, optionally by counting missing sequence numbers and forwards it to communications node 33. Node 33 inserts a further counter signifying the number of packets lost and forwards it back to communications node 31. Communications node 31 upon receiving the 3-way loopback packet containing sequence number and counters, may determine the desired PLR of communications path 36 by comparing the counters.

Note that the PLR just found relates to communications path 36 in the direction from communications node 32 to communications node 33. In similar fashion, by transmitting a triangle loopback packet to communications node 33, which inserts a packet loss counter and forwards it to communications node 32, which inserts an additional packet loss counter and forwards it back to communications node 31, one may infer PLR for path 36 in the direction from communications node 33 to communications node 32.

Obtaining an accurate estimate of the PLR requires statistics on a large number of packets. When triangle loopback testing is performed on in-service paths, it is beneficial to count loss of all packets traversing each segment, rather than only loopback packets. In order to accomplish this, communications node 32 inserts a counter signifying the total number of packets of all types transmitted towards communications node 33. Communications node 33 similarly inserts a counter signifying the total number of packets of all types received from communications node 32. When the packet is received by communications node 31 it may compare these two counters and calculate the PLR to a high degree of precision based on all packets flowing on the path between communications node 32 and 33.

In accordance with an embodiment of the invention, communications node 31 may further measure the one-way delay of communications path 36 in the direction from communications node 32 to communications node 33 as follows. First it measures round-trip packet delays D(31,32,31) and D(31,33,31) for paths 34 and 35 respectively, similarly to the way in which communications node 21 determined D(21,22,21) for path 24 between communications nodes 21 and 22, shown in FIG. 1. Under the assumption that these two paths are symmetric, it may derive the one-way delays D(31,32) and D(33,31) by dividing D(31,32,31) and D(31,33,31) respectively by two.

Communications node 31 next measures the triangle path packet delay D(31,32,33,31) for propagation from communications node 31 to communications node 32, on to communications node 33, and then returning to communications node 31. To determine D(31,32,33,31), communications node 31 transmits triangle loopback packet 150, at a time $T_T(31)$ to communications node 32 over path 34. Before transmitting the packet, it inserts a time-stamp representing this time into the packet. Communications node 32 receives packet 150 at a time $T_R(32)$, and immediately inserts a second time-stamp representing this time into the packet. After some processing and buffering delay, communications node 32 is ready to transmit the triangle loopback packet to communications node 33 at time $T_T(32)$. It inserts a third time-stamp representing this time into the packet and transmits the packet over path 36 as packet 150* to communications node 33. Communications node 33 receives packet 150* at a time $T_R(33)$ and inserts a fourth time-stamp representing this time. Communications node 33 transmits the newly addressed packet as packet 150** over path 35 to communications node 31 at time $T_T(33)$ after inserting a fifth time-stamp representing this time. Communications node 31 finally receives the triangle loopback packet at time $T_R(31)$ and may calculate the full round-trip delay without node dwell times by subtracting these dwell times from the raw round-trip latency D(31,32,33,31)=$(T_R(31)-T_T(31))-(T_T(32)-T_R(32))-(T_T(33)-T_R(33))$. Finally, the desired one-way delay over communications path 36 may be determined by subtracting the previously calculated one-way delays for paths 34 and 35, D(32,33)=D(31, 32, 33, 31)−D(31, 32)−D(33, 31).

In order to determine the one-way delay D(33,32) in the opposite direction, communications node 31 transmits a triangle loopback packet first to communications node 33, which would forward it through communications node 32 back to 31.

In an embodiment of the invention, communications node 31 acquires a plurality of measurements of D(32,33) and/or D(33,32) and uses the measurements to determine packet delay variations (PDVs) for forward (from communications node 32 to communications node 33) and backward (from communications node 33 to communications node 32) packet propagation over path 36.

In an embodiment, communications node 31: determines an average value for D(31,32,31) and for D(31,33,31); transmits a plurality of packets to propagate from communications node 31 through communications nodes 32 and 33 and back to communications node 31; measures the transit times of the plurality of packets and determines therefrom an average value for a packet delay for a packet to propagate from communications node 31, through communications nodes 32 and 33, and back to communications node 31; and uses the determined averages to determine an average packet delay for D(32,33) and/or D(33,32).

In an embodiment of the invention, nodes 32 and 33 have synchronized clocks, but do not share this synchronization with node 31. Communications node 31 sends a triangle loopback packet to node 32 which adds a transmit time-stamp $T_T(32)$ and forwards it to node 33 which adds a receive time-stamp $T_R(33)$ and forwards to originating node 31. Communications node 31 can now directly calculate D(32,33)=$T_R(33)-T_T(32)$ despite asymmetry of the paths between node 31 and nodes 32 or 33.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A method of characterizing a communications path between two communications nodes, the method comprising:
   determining a packet delay D(1,2,1) for a packet to propagate from a first communications node to a second communications node and back to the first;
   determining a packet delay D(1,3,1) for a packet to propagate from the first node to a third node and back to the first node;
   transmitting at least one packet from the first node to propagate through the second and third nodes and return to the first node;
   time stamping the at least one packet with a first time t1X at which the packet is transmitted by the first node and determining a second time t1R at which the at least one packet returns to the first node;

time stamping the at least one packet with times t2R and t2X at which the at least one packet is respectively received and transmitted by the second node;

time stamping the at least one packet with times t31:1 and t3X at which the at least one packet is respectively received and transmitted by the third node;

determining a packet delay D(2,3) in a direction from the second to the third node, or a packet delay D(3,2) in a direction from the third node to the second node for each of the at least one packet to be equal to (t1R−t1X)−D(1,2,1)/2−D(1,31)/2−(t3 X−t3 R)−(t2X−t2R) if the at least one packet was transmitted from the first node respectively to pass through the second node before passing through the third node, or to pass through the third node before passing through the second node; and using the determined packet delay D(2,3) or D(3,2) as a performance parameter for the packet propagation between the second node and the third node.

2. The method according to claim 1 wherein the at least one packet comprises a plurality of packets.

3. The method according to claim 2 and comprising determining a packet delay D(2,3) or a packet delay D(3,2) for each of the plurality of packets.

4. The method according to claim 3 and comprising using the packet delays D(2,3) or D(3,2) determined for the plurality of packets to determine a packet delay variation for packet propagation respectively from the second node to the third node or from the third node to the second node.

5. The method according to claim 1 wherein in propagating between two of the first, second, or third nodes, the at least one packet passes through a node other than the first, second, or third node.

6. The method according to claim 1 and comprising:
determining an average value for D(1,2,1), D(1,3,1);
transmitting a plurality of packets to propagate from the first node through the second and third nodes and back to the first node;
measuring the transit times of the plurality of packets and determining therefrom an average value for a packet delay for a packet to propagate from the first node, through the second third node and back to first node; and
using the determined averages to determine an average packet delay for a packet to propagate from the second node to the third node or the third node to the second node.

* * * * *